US012650840B2

(12) United States Patent
Aga et al.

(10) Patent No.: US 12,650,840 B2
(45) Date of Patent: Jun. 9, 2026

(54) DATA EVALUATION USING PROCESSING-IN-MEMORY

(71) Applicant: Advanced Micro Devices, Inc., Santa Clara, CA (US)

(72) Inventors: Shaizeen Dilawarhusen Aga, Santa Clara, CA (US); Leopold Grinberg, Belmont, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/067,506

(22) Filed: Dec. 16, 2022

(65) Prior Publication Data

US 2024/0201993 A1    Jun. 20, 2024

(51) Int. Cl.
*G06F 9/30* (2018.01)
*G06F 15/78* (2006.01)
*G06F 9/345* (2018.01)

(52) U.S. Cl.
CPC ........ *G06F 9/3004* (2013.01); *G06F 9/30192* (2013.01); *G06F 15/7821* (2013.01); *G06F 9/345* (2013.01)

(58) Field of Classification Search
CPC .............. G06F 9/3004; G06F 9/30181; G06F 9/30014; G06F 9/30025; G06F 9/3877; G06F 9/30192; G06F 15/7821
See application file for complete search history.

(56) References Cited

U.S. PATENT DOCUMENTS

| | | | |
|---|---|---|---|
| 7,725,519 B2 * | 5/2010 | Dockser .............. | G06F 9/30141 |
| | | | 708/497 |
| 8,745,111 B2 * | 6/2014 | Ollmann ............. | G06F 9/30025 |
| | | | 708/495 |
| 9,128,697 B1 * | 9/2015 | Potter ................... | G06F 9/3885 |
| 2017/0185409 A1 * | 6/2017 | de Paula Rosa Piga ................... | |
| | | | G06F 11/3409 |
| 2020/0293319 A1 * | 9/2020 | Lee .......................... | G06F 9/321 |
| 2021/0050040 A1 * | 2/2021 | Ramesh ................ | G06F 3/0659 |
| 2021/0200696 A1 * | 7/2021 | Kang ................... | G06F 13/1668 |
| 2021/0216243 A1 * | 7/2021 | Shin ....................... | G06F 3/0659 |

OTHER PUBLICATIONS

Kazi Asifuzzaman, Narasinga Rao Miniskar, Aaron R. Young, Frank Liu, Jeffrey S. Vetter, "A survey on processing-in-memory techniques: Advances and challenges", July, Memories—Materials, Devices, Circuits and Systems, vol. 4, pp. 1-11 (Year: 2023).*
Xingqi Zou, Sheng Xu, Xiaoming Chen, Liang Yan & Yinhe Han, "Breaking the von Neumann bottleneck: architecture-level processing-in-memory technology", June, Science China Press and Springer-Verlag GmbH Germany, part of Springer Nature pp. 1-10 (Year: 2021).*

* cited by examiner

*Primary Examiner* — Courtney P Spann
(74) *Attorney, Agent, or Firm* — FIG. 1 Patents

(57) ABSTRACT

Data evaluation using processing-in-memory is described. In accordance with the described techniques, data evaluation logic is loaded into a processing-in-memory component. The processing-in-memory component executes the data evaluation logic to evaluate a minimum number of bits required to retrieve data from, or store data to, at least one memory location. A result is output indicating the number of bits required to represent data at the at least one memory location based on the evaluation.

20 Claims, 4 Drawing Sheets

100

200

Host 102

Data Evaluation Logic 114

Processing-in-Memory Component 112

Memory 110

Extraction Request 202

Requested Bits 204

Evaluate Bits 206

Store Result 208

Result 116

300

302
Load data evaluation logic into a processing-in-memory component

304
Execute, by the processing-in-memory component, the data evaluation logic to evaluate a number of bits used to store data in at least one memory location

306
Output a result indicating the number of bits used to store data in the at least one memory location

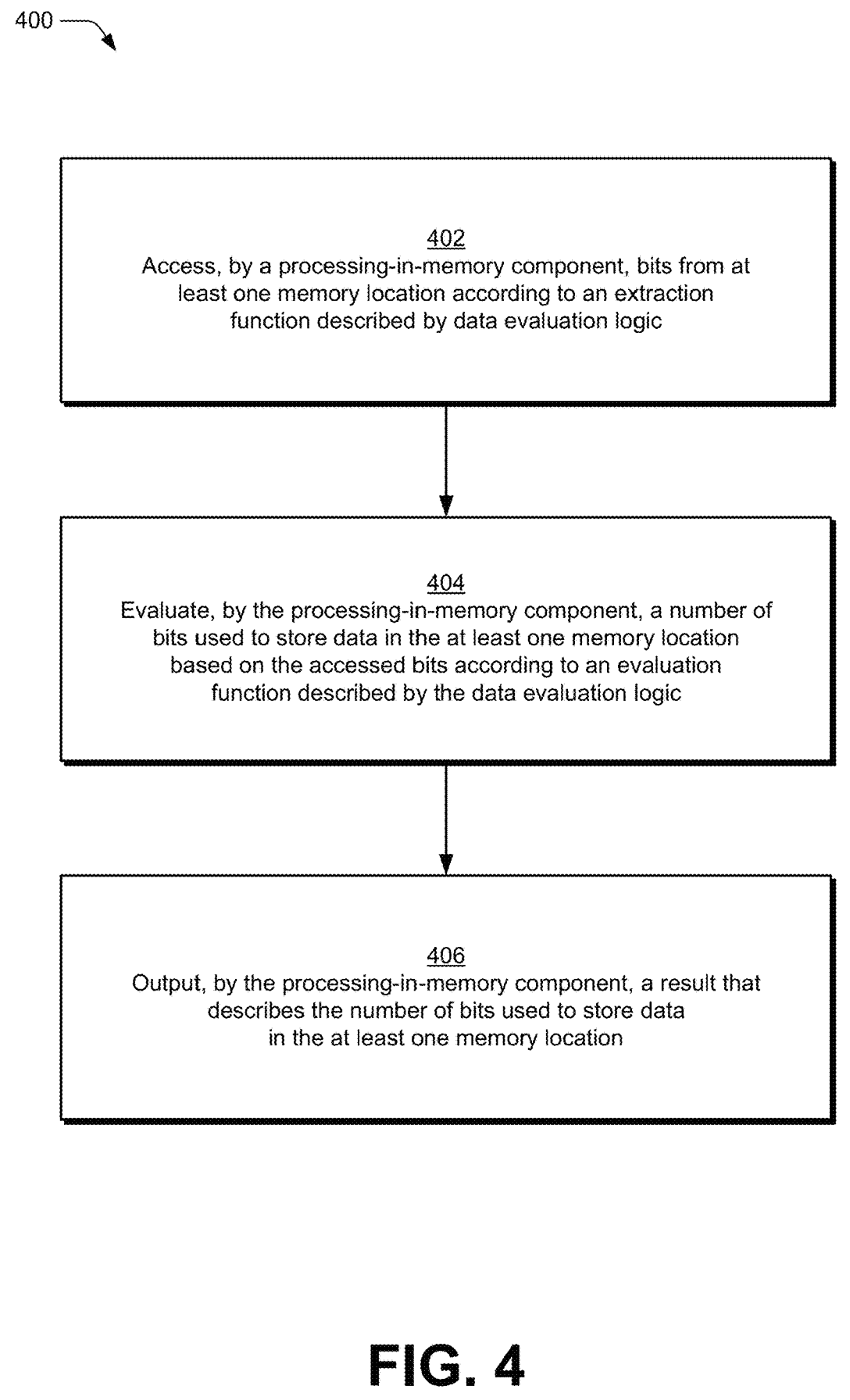

400 —

402
Access, by a processing-in-memory component, bits from at least one memory location according to an extraction function described by data evaluation logic

404
Evaluate, by the processing-in-memory component, a number of bits used to store data in the at least one memory location based on the accessed bits according to an evaluation function described by the data evaluation logic

406
Output, by the processing-in-memory component, a result that describes the number of bits used to store data in the at least one memory location

FIG. 4

DATA EVALUATION USING PROCESSING-IN-MEMORY

BACKGROUND

Processing-in-memory (PIM) architectures move processing of memory intensive computations to memory. This contrasts with standard computer architectures which communicate data back and forth between a memory and a remote processing unit. In terms of data communication pathways, remote processing units of conventional computer architectures are further away from memory than processing-in-memory components. As a result, these conventional computer architectures suffer from increased data transfer latency, which can decrease overall computer performance. Further, due to the proximity to memory, PIM architectures can also provision higher memory bandwidth and reduced memory access energy relative to conventional computer architectures particularly when the volume of data transferred between the memory and the remote processing unit is large. Thus, processing-in-memory architectures enable increased computer performance while reducing data transfer latency as compared to conventional computer architectures that implement remote processing hardware.

BRIEF DESCRIPTION OF THE DRAWINGS

FIG. 4 depicts a procedure in an additional example implementation of data evaluation using processing-in-memory.

DETAILED DESCRIPTION

Overview

Figure 1:
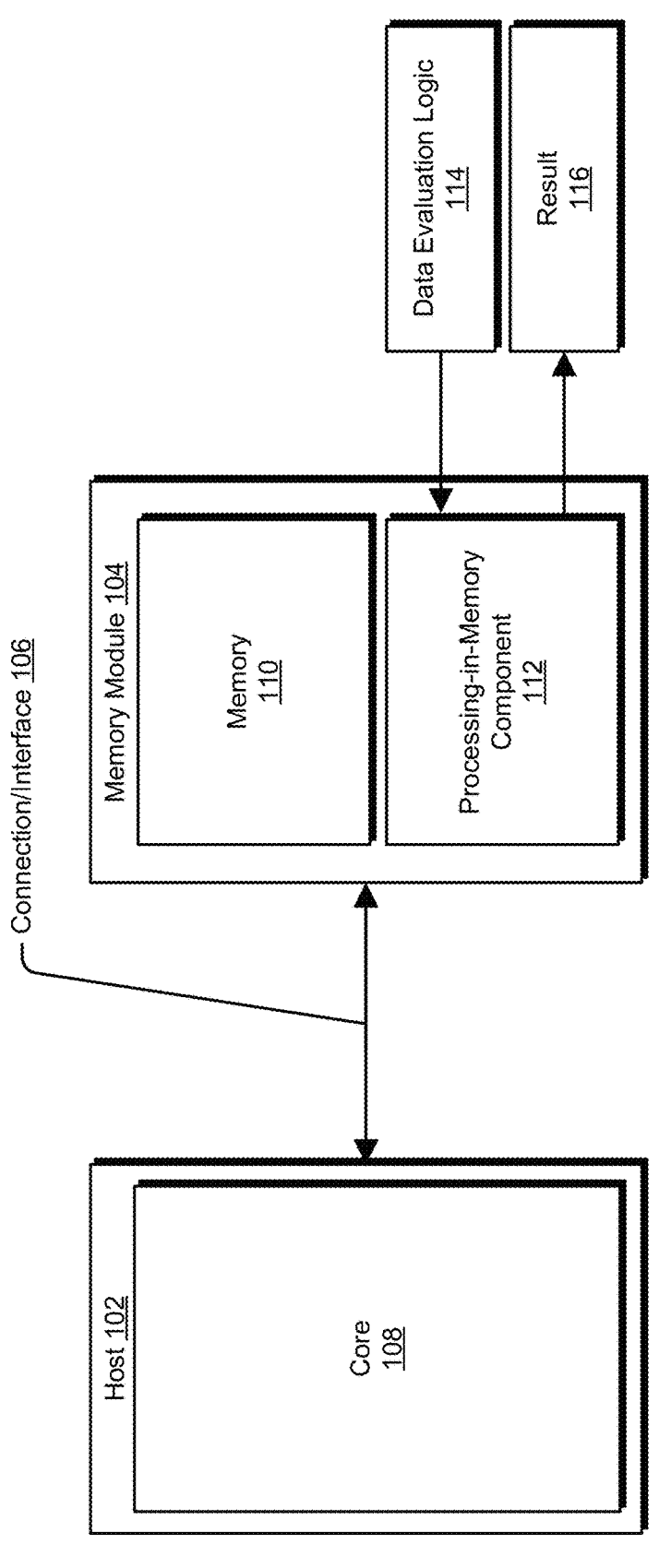
FIG. 1 is a block diagram of a non-limiting example system having a host with a core and a memory module with a memory and a processing-in-memory component.

Computing devices support a wide variety of data formats, and many computational algorithms are designed to represent data using fewer bits when performing a task. For instance, in machine learning applications, training and inference steps that conventionally use 64 bits to represent data are configured to represent data using fewer bits, such as 32 bits, 16 bits, eight bits, and so forth. However, while using fewer bits to represent data often reduces computational resources and processing time required to perform a given task, reduced bit data representations often produce suboptimal results. As an example, when training a machine learning model, naively representing training data using fewer bits often strips important information that would otherwise be maintained using additional bits and risks not having enough bits to cover a requisite data range.

Conversely, using too many bits to represent data unnecessarily consumes processing resources and associated power and unduly increases memory bus traffic. For instance, consider an example scenario where data is represented as an integer stored in a 16-bit memory cell that could also be stored in an 8-bit memory cell (e.g., the integer is in the range of 0 to 255). In this example scenario, performing a computational task that processes the data as a 16-bit integer based on the memory cell wastes processing resources in processing the additional bits that are unnecessary to represent the integer. Continuing this example scenario, if a host retrieving data from a memory location to perform a computation has bandwidth to retrieve 16 bits per clock cycle, representing numerical values as 16-bit integers instead of 8-bit integers would require twice the amount of clock cycles to complete retrieval. Thus, selecting an appropriate number of bits for representing data remains an important consideration in many computational tasks.

To address these conventional problems, data evaluation using processing-in-memory is described. In implementations, a system includes a memory module having a memory and a processing-in-memory component. The memory module is communicatively coupled to a core of a host, such as a core of a host processor. Using the techniques described herein, the processing-in-memory component is configured to evaluate a number of bits required to represent data stored in at least one memory location of the memory module. Advantageously, the processing-in-memory component evaluates the number of bits required to represent data independent of (e.g., without) of traffic on a connection that communicatively couples the memory module to a host. Thus, in contrast to conventional system that perform computational tasks by reading data from memory, transferring the data from memory to a host processor, and performing computations at the host processor using the transferred data, the processing-in-memory component is configured to perform the techniques described herein independent of transferring evaluated data to a host processor.

In accordance with one or more implementations, the processing-in-memory component is configured to perform data evaluation on data stored in one or more memory locations based on data evaluation logic. In some implementations, the data evaluation logic is received in a command or an instruction from a host processor communicatively coupled to a memory module implementing the processing-in-memory component. Alternatively or additionally, the processing-in-memory component is configured to perform data evaluation based on data evaluation logic stored in the memory module. Alternatively or additionally, the processing-in-memory component is configured to perform data evaluation based on data evaluation logic stored in the processing-in-memory component (e.g., data evaluation logic maintained in one or more registers of the processing-in-memory component).

The data evaluation logic includes instructions that are executable by the processing-in-memory component to perform the techniques described herein. In some implementations, the instructions included in the data evaluation logic include range constraints that identify locations in memory storing data to be evaluated by the processing-in-memory component. In some implementations, the instructions further include an extraction function that identifies which bits of data included in each of the memory locations identified by the range constraints are to be retrieved for evaluation by the processing-in-memory component. In some implementations, the instructions further include an evaluation function that describes how the processing-in-memory component evaluates bits retrieved from memory. The evaluation function is configurable to include one or more conditions. In some implementations, the one or more conditions included in the evaluation function are configured based on a manner in which a result of the data evaluation is to be used.

For example, an evaluation function is configurable to include a condition that causes the processing-in-memory component to evaluate whether a memory location includes an entry that represents data using more than a threshold number of bits (e.g., check whether a dynamic random-access memory (DRAM) bank includes an entry that represents data using more than 32 bits). As another example, an evaluation function is configurable to include a condition that causes the processing-in-memory component to identify how many bits are needed to safely represent data stored in a memory location (e.g., identify a minimum number of bits required to fully represent data of each entry in a DRAM bank). As yet another example, an evaluation function is configurable to include a condition that causes the processing-in-memory component to terminate further data evaluation operations in response to satisfying threshold criteria (e.g., stop evaluating data in response to identifying that greater than 50% of entries in a DRAM array require more than ten bits to represent stored data).

The data evaluation logic further includes an instruction for outputting a result of the data evaluation. In some implementations, the instructions cause a processing-in-memory component to communicate a result of the data evaluation to a host communicatively coupled to the memory module implementing the processing-in-memory component. Alternatively or additionally, the instructions cause the processing-in-memory component to store the data evaluation result locally, such as in memory, in a register of the processing-in-memory component, or a combination thereof.

Although described with respect to a single processing-in-memory component, the described techniques are configured for implementation by multiple processing-in-memory components in parallel (e.g., simultaneously). For instance, in an example scenario where memory is configured as DRAM, a processing-in-memory component is included at each hierarchical DRAM component (e.g., channel, bank, array, and so forth). Continuing this example where data evaluation logic is transmitted to the memory module via a command from a host processor, the data evaluation logic is provided to each processing-in-memory component in parallel. Thus, rather than requiring multiple commands, one for each memory component, to perform data evaluations, the described techniques enable a single command to cause each processing-in-memory component to perform data evaluation for a corresponding memory unit.

By analyzing data stored in memory using the processing-in-memory component, the described techniques do not cause additional traffic on the interface between a host processor and a memory module implementing the processing-in-memory component. This is not possible using conventional systems, which utilize the core of the remote host processor to perform operations involving data stored in memory. The described techniques further advantageously save cycles of the remote host processor, which reduces system power consumption and frees the host processor to perform additional operations relative to conventional systems.

In some aspects, the techniques described herein relate to a system including: a memory of a memory module, and a processing-in-memory component of the memory module configured to: receive data evaluation logic, execute the data evaluation logic to evaluate a number of bits required to represent data stored in at least one memory location of the memory, and output a result indicating the number of bits required to represent the data stored in the at least one memory location.

In some aspects, the techniques described herein relate to a system, wherein the data stored in the at least one memory location is stored in a floating point format and the processing-in-memory component is configured to execute the data evaluation logic by extracting floating point range bits from the at least one memory location.

In some aspects, the techniques described herein relate to a system, wherein the data stored in the at least one memory location is stored in an integer format and the processing-in-memory component is configured to execute the data evaluation logic by extracting a subset of bits for the integer format from the at least one memory location, wherein the subset of bits is specified by the data evaluation logic.

In some aspects, the techniques described herein relate to a system, wherein the result indicates a maximum number of bits required to represent the data stored in the at least one memory location.

In some aspects, the techniques described herein relate to a system, wherein the data evaluation logic includes a configurable condition that causes the processing-in-memory component to terminate executing the data evaluation logic responsive to identifying that a threshold number of memory locations require more than a threshold number of bits to store data.

In some aspects, the techniques described herein relate to a system, wherein the processing-in-memory component is configured to receive the data evaluation logic as part of a command received from a host that includes a core, wherein the processing-in-memory component is configured to output the result to the host.

In some aspects, the techniques described herein relate to a system, the memory module further including a plurality of processing-in-memory components wherein the memory module is configured to load the data evaluation logic into each of the plurality of processing-in-memory components and cause each of the plurality of processing-in-memory components to execute the data evaluation logic.

In some aspects, the techniques described herein relate to a system, wherein the processing-in-memory component is configured to execute the data evaluation logic responsive to detecting a memory operation to the at least one memory location.

In some aspects, the techniques described herein relate to a system, wherein the data evaluation logic identifies the at least one memory location.

In some aspects, the techniques described herein relate to a system, wherein the processing-in-memory component is configured to output the result by writing the result to a memory location that is communicatively coupled to a host that includes a core.

In some aspects, the techniques described herein relate to a system, wherein the core is a central processing unit or a graphics processing unit.

In some aspects, the techniques described herein relate to a system, wherein the processing-in-memory component is configured to output the result by storing the result in a register of the processing-in-memory component.

In some aspects, the techniques described herein relate to a system, wherein the data evaluation logic is received from a host that includes a core and the processing-in-memory component is configured to execute the data evaluation logic independent of traffic on a connection between the host and the memory.

In some aspects, the techniques described herein relate to a method including loading data evaluation logic into a processing-in-memory component, executing, by the processing-in-memory component, the data evaluation logic to evaluate a number of bits required to represent data stored in at least one memory location, and outputting a result indicating the number of bits required to represent the data stored in the at least one memory location.

In some aspects, the techniques described herein relate to a method, wherein loading the data evaluation logic into the processing-in-memory component is performed responsive to receiving a data evaluation command from a host that includes a core and outputting the result includes communicating the result to the host.

In some aspects, the techniques described herein relate to a method, further including loading the data evaluation logic into a plurality of processing-in-memory components responsive to receiving the data evaluation command from the host and causing each of the plurality of processing-in-memory components to execute the data evaluation logic.

In some aspects, the techniques described herein relate to a method, wherein the result indicates a maximum number of bits required to represent the data stored in the at least one memory location.

In some aspects, the techniques described herein relate to a method, wherein executing the data evaluation logic is performed responsive to detecting a memory operation to the at least one memory location.

In some aspects, the techniques described herein relate to a method, wherein outputting the result includes writing the result to a memory location that is communicatively coupled to a host that includes a core.

In some aspects, the techniques described herein relate to a method including: monitoring, by a processing-in-memory component, at least one memory location, executing, by the processing-in-memory component, stored data evaluation logic to evaluate a number of bits required to represent data stored in at least one memory location in response to detecting a write operation to the at least one memory location, and outputting a result indicating the number of bits required to represent the data stored in the at least one memory location.

FIG. 1 is a block diagram of a system 100 that includes a host with a core and further includes a memory module with a memory and a processing-in-memory component. In particular, the system 100 includes host 102 and memory module 104, where the host 102 and the memory module 104 are communicatively coupled via connection/interface 106. In one or more implementations, the host 102 includes core 108, and the memory module 104 includes memory 110 and processing-in-memory component 112.

In accordance with the described techniques, the host 102 and the memory module 104 are coupled to one another via a wired or wireless connection, which is depicted in the illustrated example of FIG. 1 as the connection/interface 106. Example wired connections include, but are not limited to, buses (e.g., a data bus), interconnects, traces, and planes. Examples of devices in which the system 100 is implemented include, but are not limited to, supercomputers and/or computer clusters of high-performance computing (HPC) environments, servers, personal computers, laptops, desktops, game consoles, set top boxes, tablets, smartphones, mobile devices, virtual and/or augmented reality devices, wearables, medical devices, systems on chips, and other computing devices or systems.

The host 102 is an electronic circuit that performs various operations on and/or using data in the memory 110. Examples of the host 102 and/or the core 108 include, but are not limited to, a central processing unit (CPU), a graphics processing unit (GPU), a field programmable gate array (FPGA), an accelerated processing unit (APU), and a digital signal processor (DSP). For example, the core 108 is a processing unit that reads and executes instructions (e.g., of a program), examples of which include to add, to move data, and to branch. Although one core 108 is depicted in the illustrated example, in variations, the host 102 includes more than one core 108 (e.g., the host 102 is a multi-core processor).

In one or more implementations, the memory module 104 is a circuit board (e.g., a printed circuit board), on which the memory 110 is mounted and includes the processing-in-memory component 112. In some variations, one or more integrated circuits of the memory 110 are mounted on the circuit board of the memory module 104, and the memory module 104 includes one or more processing-in-memory components 112. Examples of the memory module 104 include, but are not limited to, a TransFlash memory module, a single in-line memory module (SIMM), and a dual in-line memory module (DIMM). In one or more implementations, the memory module 104 is a single integrated circuit device that incorporates the memory 110 and the processing-in-memory component 112 on a single chip. In some examples, the memory module 104 is composed of multiple chips that implement the memory 110 and the processing-in-memory component 112 that are vertically ("3D") stacked together, are placed side-by-side on an interposer or substrate, or are assembled via a combination of vertical stacking or side-by-side placement.

The memory 110 is a device or system that is used to store information, such as for immediate use in a device (e.g., by the core 108 of the host 102 and/or by the processing-in-memory component 112). In one or more implementations, the memory 110 corresponds to semiconductor memory where data is stored within memory cells on one or more integrated circuits. In at least one example, the memory 110 corresponds to or includes volatile memory, examples of which include random-access memory (RAM), dynamic random-access memory (DRAM), synchronous dynamic random-access memory (SDRAM), and static random-access memory (SRAM).

In some implementations, the memory 110 corresponds to or includes a cache memory of the core 108 and/or the host 102 such as a level 1 cache, a level 2 cache, a level 3 cache, and so forth. For example, the memory 110 represents high bandwidth memory (HBM) in a 3D-stacked implementation. Alternatively or additionally, the memory 110 corresponds to or includes non-volatile memory, examples of which include solid state disks (SSD), flash memory, read-only memory (ROM), programmable read-only memory (PROM), erasable programmable read-only memory (EPROM), and electronically erasable programmable read-only memory (EEPROM). The memory 110 is thus configurable in a variety of ways that support memory verification (e.g., of the memory 110) using processing-in-memory without departing from the spirit or scope of the described techniques.

Broadly, the processing-in-memory component 112 is configured to process processing-in-memory instructions, e.g., received from the core 108 via the connection/interface 106. The processing-in-memory component 112 is representative of a processor with example processing capabilities ranging from relatively simple (e.g., an adding machine) to relatively complex (e.g., a CPU/GPU compute core). In an example, the processing-in-memory component 112 processes the instructions using data stored in the memory 110.

Processing-in-memory contrasts with standard computer architectures which obtain data from memory, communicate the data to a remote processing unit (e.g., the core 108 of the host 102), and process the data using the remote processing unit (e.g., using the core 108 of the host 102 rather than the processing-in-memory component 112). In various scenarios, the data produced by the remote processing unit as a result of processing the obtained data is written back to memory, which involves communicating the produced data over the connection/interface 106 from the remote processing unit to memory. Further contrasting with standard computer architectures, the processing-in-memory component 112 is configured to perform the techniques described herein without using caches, while standard computer architectures such as CPUs, GPUs, and so forth implement multiple levels of caches to load and store data. In terms of data communication pathways, the remote processing unit (e.g., the core 108 of the host 102) is further away from the memory 110 than the processing-in-memory component 112, both physically and topologically. As a result, conventional computer architectures suffer from increased data transfer latency, reduced data communication bandwidth, and increased data communication energy, particularly when the volume of data transferred between the memory and the remote processing unit is large, which can also decrease overall computer performance.

Thus, the processing-in-memory component 112 enables increased computer performance while reducing data transfer energy as compared to standard computer architectures that implement remote processing hardware. Further, the processing-in-memory component 112 alleviates memory performance and energy bottlenecks by moving one or more memory-intensive computations closer to the memory 110. Although the processing-in-memory component 112 is illustrated as being disposed within the memory module 104, in some examples, the described benefits of memory verification using processing-in-memory are realizable through near-memory processing implementations in which the processing-in-memory component 112 is disposed in closer proximity to the memory 110 (e.g., in terms of data communication pathways) than the core 108 of the host 102.

The processing-in-memory component 112 is illustrated as receiving data evaluation logic 114, which represents instructions that are executable by the processing-in-memory component 112 to cause the processing-in-memory component 112 to perform operations relative to the memory 110. In accordance with the described techniques, execution of the data evaluation logic 114 causes the processing-in-memory component 112 to evaluate data stored in one or more locations in memory 110 to identify a number of bits required to represent data stored in the one or more locations in memory 110. In one example, the processing-in-memory component 112 receives the data evaluation logic 114 from the host 102 and/or the core 108 (e.g., via the interface 106). Alternatively or additionally, the processing-in-memory component 112 receives (e.g., loads) the data evaluation logic 114 from a dedicated portion of the memory 110 (e.g., an externally non-addressable memory of a bank of the memory 110). Alternatively or additionally, the processing-in-memory component 112 receives (e.g., loads) the data evaluation logic 114 from a defined location within the system 100 (e.g., independent of creating traffic to/from the memory module 104).

The data evaluation logic 114 includes instructions that are executable by the processing-in-memory component 112 to perform the techniques described herein. In accordance with one or more implementations, the data evaluation logic 114 specifies range constraint instructions that identify one or more locations in memory at which stored data is to be evaluated by the processing-in-memory component 112. The data evaluation logic 114 are further representative of instructions that include an extraction function to be executed by the processing-in-memory component 112 when retrieving data from the one or more memory 110 locations specified by the range constraint instructions.

For instance, an extraction function included in data evaluation logic 114 is configurable based on a format in which data is stored in the memory 110. As illustrative examples, consider a first extraction function that is useable to retrieve data stored in memory 110 using a floating-point data format and a second extraction function that is useable to retrieve data stored in memory 110 using an integer format. When stored using a floating-point data format, data is generally represented using a first bit (e.g., a left-most bit) that represents a sign (e.g., positive or negative) for a numerical value, a plurality of range bits following the sign bit, and a plurality of precision bits following the plurality of range bits. When stored using an integer data format, data is generally represented using a first bit (e.g., a left-most bit) that represents a sign (e.g., positive or negative) for a numerical value and a plurality of bits following the sign bit that indicate the integer's numerical value (e.g., "rest" bits). For instance, using a 32-bit integer as an example, a left-most bit in the 32-bit integer represents a sign bit and is the "highest-order" bit. Bits to the right of the sign bit (e.g., bit 30 to bit zero) indicate the integer's numerical value and can be described as being of lower order based on their respective position, such that bit zero is the "lowest-order" bit.

When performing the data evaluation techniques described herein, it is not necessary for the processing-in-memory component 112 to evaluate every bit used to represent a numerical value. Rather, it is the plurality of range bits for floating-point data formats and a subset of the plurality of bits for integer data formats that define how many bits are required to represent data represented by the respective storage format. Consequently, the first extraction function is configurable to cause the processing-in-memory component 112 to extract range bits from locations in memory 110 that store data using floating-point data formats. Similarly, the second extraction function is configurable to cause the processing-in-memory component 112 to extract a subset of bits from locations in the memory 110 that store data using integer data formats. In implementations, an extraction function included in the data evaluation logic 114 is configurable to specify a particular number of bits to be extracted by the processing-in-memory component 112 (e.g., a particular number of range bits to be retrieved from memory locations configured with floating-point data formats or a particular number and position of bits to be retrieved from memory locations configured with integer data formats). As an example, in a scenario where a memory location stores data represented using an integer format, the second extraction function is configurable to specify a subset (e.g., a proper subset) of bits stored in the memory location to be retrieved by the processing-in-memory component 112 (e.g., specify the sign bits and the next four highest-ordered bits, specify six bits to the right of the sign bit, and so forth).

The data evaluation logic 114 are further representative of one or more instructions that include an evaluation function to be executed by the processing-in-memory component 112 when evaluating data retrieved from one or more memory 110 according to the extraction function. An evaluation function set forth in the data evaluation logic 114 is configurable to include one or more conditions. In implementations, the one or more conditions included in the evaluation function are configured based on a manner in which a result of the data evaluation is to be used.

For example, an example evaluation function included in the data evaluation logic 114 is configured with a condition that causes the processing-in-memory component 112 to evaluate whether a location in memory 110 includes an entry that represents data using more than a threshold number of bits (e.g., check whether a DRAM bank includes an entry that represents data using more than 16 bits). As another example, an evaluation function included in the data evaluation logic 114 is configured with a condition that causes the processing-in-memory component 112 to evaluate how many bits are needed to safely represent data stored in a location in memory 110 when performing a computational task using the stored data.

As a specific example, such an evaluation function causes the processing-in-memory component 112 to identify a minimum number of bits required to represent a numerical value stored in each entry of a DRAM bank, a DRAM array, and so forth. As yet another example, an evaluation function included in the data evaluation logic 114 is configured with a terminating condition that causes the processing-in-memory component 112 to stop performing data evaluation operations when threshold criteria are satisfied. For instance, an example terminating condition of an evaluation function included in the data evaluation logic 114 causes the processing-in-memory component 112 to stop evaluating data stored in the memory 110 in response to satisfying a threshold metric (e.g., terminate performing data evaluation operations in response to identifying that 50% or more of entries in a DRAM array require more than ten bits to represent stored data).

The evaluation functions and respective configurable conditions described herein are not intended to be limiting and are merely illustrative examples of evaluation functions set forth in the data evaluation logic 114. In implementations, the evaluation function(s) set forth in data evaluation logic 114 are task-specific and configured (e.g., by a computer program developer) based on factors such as past data streams or statistics. For instance, in an example scenario past statistics for a given computational task indicate that greater than ten bits is likely unnecessary for safely representing data processed as part of the given computational task. In this example scenario, the data evaluation logic 114 is configured to include an evaluation function that causes the processing-in-memory component 112 to determine whether data stored in memory 110 to be processed for a subsequent given computational task includes any entries that require more than ten bits to fully represent. Such a data evaluation operation provides an indication to the host 102 as to whether it is safe to represent stored data using only ten bits.

The data evaluation logic 114 are further representative of one or more instructions that cause the processing-in-memory component 112 to output a result 116 that includes information generated from performing the one or more evaluation functions set forth in the data evaluation logic 114. For instance, consider an example implementation where the data evaluation logic 114 include an evaluation function that causes the processing-in-memory component 112 to evaluate a minimum number of bits required to safely express data stored in a DRAM array of memory 110. In response to retrieving data from the DRAM array and evaluating the retrieved data to identify that no entry in the DRAM array requires more than eight bits to represent stored data, the processing-in-memory component 112 outputs result 116 to indicate that eight bits are required to safely represent data of the DRAM array.

Instructions included in the data evaluation logic 114 for outputting a result 116 are configurable in a variety of manners. For instance, in some implementations the data evaluation logic 114 include an instruction that causes the processing-in-memory component 112 to communicate the result 116 to the host 102 (e.g., via the interface 106). Alternatively or additionally, in some implementations the data evaluation logic 114 include an instruction that causes the processing-in-memory component 112 to output the result 116 to a storage location in memory 110 (e.g., for subsequent access and/or retrieval by the host 102). Alternatively or additionally, in some implementations the data evaluation logic 114 include an instruction that causes the processing-in-memory component 112 to store the result 116 locally (e.g., in a register of the processing-in-memory component 112).

In some implementations, the data evaluation logic 114 is received by the processing-in-memory component 112 as part of a command from the host 102 (e.g., as part of a command transmitted to the memory module 104 from the host 102). The processing-in-memory component 112 is thus configured to perform the data evaluation operations described herein responsive to an instruction by the host 102. Alternatively or additionally, the processing-in-memory component 112 is configured to execute instructions set forth in the data evaluation logic 114 independent of receiving a command or instruction from the host 102. For instance, in an example implementation the processing-in-memory component 112 is configured to store the data evaluation logic 114 locally (e.g., in one or more registers of the processing-in-memory component 112). In such an implementation, the data evaluation logic 114 are configured to cause the processing-in-memory component 112 to monitor one or more defined locations in memory 110 (e.g., a defined memory address range, non-contiguous storage locations in memory 110, or a combination thereof) and execute instructions set forth in the data evaluation logic 114 in response to a memory operation at the one or more defined locations in memory 110 (e.g., a read operation to one or more defined locations in memory 110, a write operation to one or more defined locations in memory 110, a read-modify-write operation to one or more defined locations in memory 110, and so forth).

For instance, in an example scenario where the host 102 writes data to an array in memory 110 using 64-bit data representations, the host 102 may subsequently want to know whether subsequent write operations could be performed using fewer bits. By being configured to perform data evaluation operations in response to detecting the write operation, the processing-in-memory component 112 is configured to generate a result 116 that indicates a maximum number of bits that were actually needed to perform the storage operation (e.g., only 32 bits were needed to represent the written data). In this example implementation, the processing-in-memory component 112 proactively generates a result 116 to indicate the required number of bits to represent data independent of a request or instruction from the host 102 (e.g., before the host 102 issues a command to the processing-in-memory component 112 to evaluate data written to the memory 110).

Because the processing-in-memory component 112 executes the data evaluation logic 114 to evaluate data stored in memory 110, the processing-in-memory component 112 performs the described techniques with minimal impact on the system 100 (e.g., without invalidating caches of the system 100 or causing traffic on the connection/interface 106). For instance, the processing-in-memory component 112 performs data evaluation operations on the memory 110 "in the background" with respect to the host 102 and the core 108, which frees up cycles of the host 102 and/or the core 108, reduces memory bus traffic (e.g., reduces traffic on the connection/interface 106), and reduces power consumption relative to performing operations at the host 102 and/or the core 108. Notably, because the processing-in-memory component 112 is closer to the memory 110 than the core 108 of the host 102 in terms of data communication pathways, evaluating data stored in memory 110 is generally completable in a shorter amount of time using the processing-in-memory component 112 than if the evaluation were performed using the core 108 of the host 102.

Figure 2:
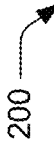
FIG. 2 depicts a non-limiting example of using processing-in-memory for data evaluation.

FIG. 2 depicts an example 200 of using processing-in-memory to evaluate data stored in memory.

The example 200 is depicted as including the host 102, the memory 110, and the processing-in-memory component 112. The processing-in-memory component 112 is depicted as receiving (e.g., loading) and executing instructions included in the data evaluation logic 114, which cause the processing-in-memory component 112 to evaluate data stored in one or more locations of memory 110. Example locations in memory 110 include a bank of the memory 110, a cell of the memory 110, a block of the memory 110, and so forth. In executing the instructions set forth in the data evaluation logic 114, the processing-in-memory component 112 is configured to retrieve data from the memory 110 using an extraction request 202. The extraction request 202 is representative of a request for bits of data stored in one or more locations of the memory 110. In implementations, the specific bits of data requested from a given memory 110 location as part of the extraction request 202 are defined by the range constraints and an extraction function included in the data evaluation logic 114. For instance, in an example scenario where the extraction request 202 is used to retrieve data from a location in memory 110 that represents a numerical value using an integer format, the extraction request 202 is a request for a subset of bits defined by a certain number and/or certain bit positions (e.g., eight bits to the right of a sign bit for the numerical value) stored in the memory 110 location.

The processing-in-memory component 112 retrieves requested bits 204 identified by the extraction request 202 from one or more locations in memory 110. After receiving the bits 204 from one or more storage locations in memory 110, the processing-in-memory component 112 is configured to evaluate the bits 206. To evaluate the bits 206, the processing-in-memory component 112 executes one or more evaluation functions set forth in the data evaluation logic 114. As described above, in implementations executing an evaluation function set forth in the data evaluation logic 114 is influenced by one or more configurable conditions.

For instance, in an example scenario where the bits 204 include bits from different arrays in a DRAM bank, the processing-in-memory component 112 is configured to evaluate the bits 206 by executing an evaluation function in the data evaluation logic 114 that causes the processing-in-memory component 112 to evaluate a maximum range needed to represent data stored individual arrays of the DRAM bank using a floating-point data format. In this example scenario, the processing-in-memory component 112 is configured to evaluate the bits 206 by identifying a maximum number of floating-point range bits required to represent data stored in each array of the DRAM bank and output a result indicating the largest number of range bits required by one or more of the arrays in the DRAM bank. In this manner, the result 116 is configured to describe a minimum number of bits required to store data at a given location as well as the data cast (e.g., written) to the minimum number of bits. Alternatively or additionally, the result 116 is configured to describe a minimum number of bits required to store data at multiple different locations in memory, as well as data cast to the respective minimum number of bits for each of the different locations in memory.

In some implementations, the processing-in-memory component 112 is configured to store a result 208 generated from performing operations involved as part of evaluating the bits 206. For instance, in some implementations the processing-in-memory component 112 stores the result 116 in a storage location of memory 110. Alternatively or additionally, the processing-in-memory component 112 is configured to store a result 208 generated from evaluating the bits 204 locally (e.g., in one or more registers of the processing-in-memory component 112).

Alternatively or additionally, in some implementations the processing-in-memory component 112 is configured to output the result 116 to the host 102. For instance, the processing-in-memory component 112 communicates the result 116 to the host 102 via the interface 106. In this manner, the host 102 is informed as to how data stored in the memory 110 can be safely processed when performing a computational task (e.g., informed as to whether data stored in an array of memory 110 occupying 64 bits can be comprehensively read and processed as 32 bits).

Figure 3:
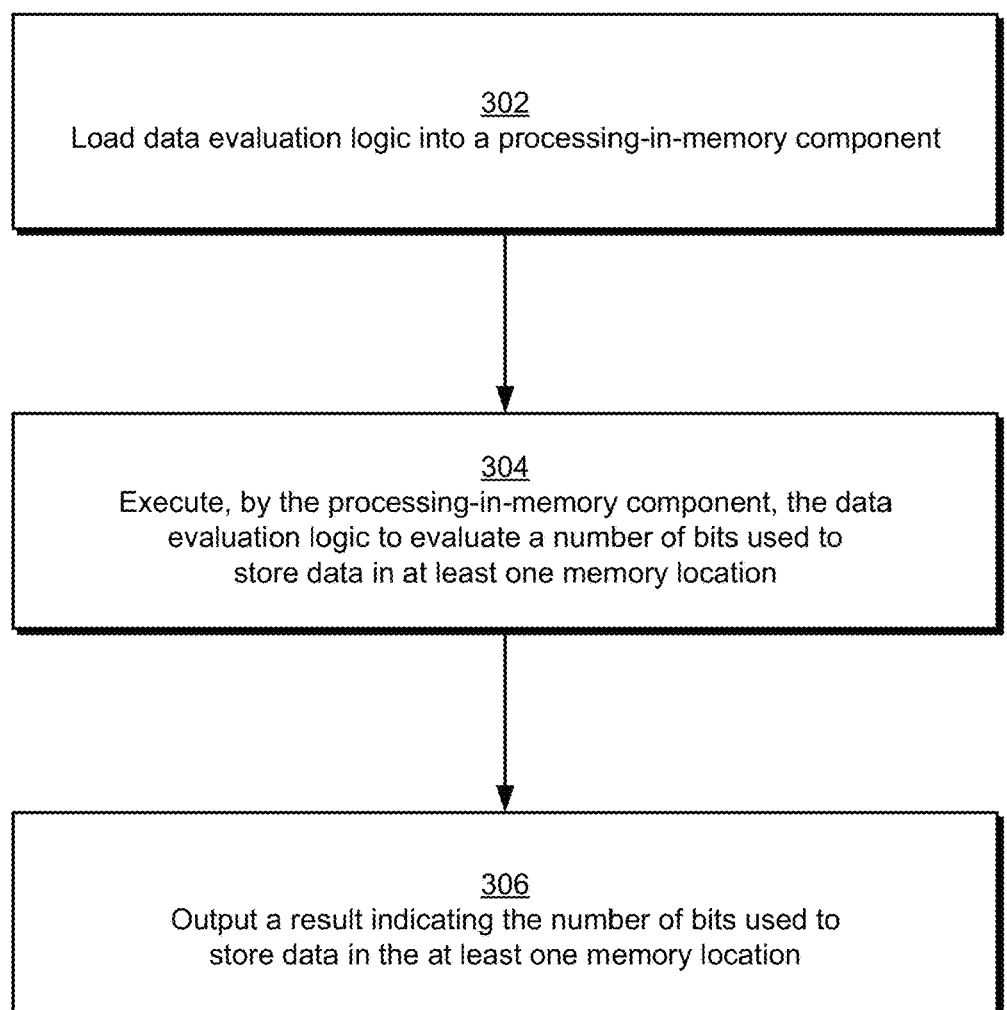
FIG. 3 depicts a procedure in an example implementation of data evaluation using processing-in-memory.

FIG. 3 depicts a procedure 300 in an example implementation of data evaluation using processing-in-memory.

Data evaluation logic is loaded into a processing-in-memory component (block 302). For instance, the data evaluation logic 114 is loaded into processing-in-memory component 112 from the host 102, from a dedicated portion of the memory 110, from another location within the memory 110, combinations thereof, and so forth. As an example, the data evaluation logic 114 is loaded into the processing-in-memory component 112 at the instruction of an application kernel executing on the host 102. As another example, the data evaluation logic 114 is loaded into the processing-in-memory component 112 upon an initialization of the system 100 (e.g., during boot of the system 100).

The data evaluation logic is executed by the processing-in-memory component to evaluate a number of bits used to store data in at least one memory location (block 304). For instance, the data evaluation logic 114 includes instructions and executing the instructions included in the data evaluation logic 114 causes the processing-in-memory component 112 to evaluate data maintained in at least one storage location of memory 110. In implementations, executing instructions included in the data evaluation logic 114 causes the processing-in-memory component 112 to issue an extraction request 202 for bits stored in at least one location of memory 110 identified by range constraints of the data evaluation logic 114 using an extraction function set forth in the data evaluation logic 114. In implementations, executing the instructions included in the data evaluation logic 114 further causes the processing-in-memory component 112 to evaluate requested bits 204 retrieved from memory 110 using an evaluation function set forth in the data evaluation logic 114 that defines a result to be generated from evaluating the requested bits 204.

A result indicating the number of bits used to store data in the at least one memory location is output (block 306). For instance, the processing-in-memory component 112 generates the result 116 by executing the evaluation function set forth in the data evaluation logic 114 and outputs the result 116 to the host 102. Alternatively or additionally, the processing-in-memory component 112 stores the result 116 for subsequent access by the host 102, such as in one or more storage locations of memory 110, locally in one or more registers of the processing-in-memory component 112, or combinations thereof.

FIG. 4 depicts a procedure 400 in an example implementation of data evaluation using processing-in-memory.

Bits from at least one memory location are accessed according to an extraction function described by data evaluation logic (block 402). For instance, the data evaluation logic 114 includes at least one range constraint that identifies one or more locations in memory 110 from which bits of stored data are to be extracted and an evaluation function that describes a manner in which the bits of stored data are to be retrieved from memory 110 by the processing-in-memory component 112. In one example, the extraction function describes a subset of bits for an integer representation of a numerical value that are to be retrieved from at least one storage location in memory 110 specified by range constraints of the data evaluation logic 114.

A number of bits used to store data in the at least one memory location is evaluated based on the accessed bits according to an evaluation function described by the data evaluation logic (block 404). For instance, the data evaluation logic 114 includes an evaluation function with one or more configurable conditions for evaluating requested bits 204 retrieved from memory 110 according to the extraction function described by the data evaluation logic 114.

A result that describes the number of bits used to store data in the at least one memory location is output (block 406). For instance, the processing-in-memory component 112 generates the result 116 by executing the evaluation function set forth in the data evaluation logic 114 and outputs the result 116 to the host 102. Alternatively or additionally, the processing-in-memory component 112 stores the result 116 for subsequent access by the host 102, such as in one or more storage locations of memory 110, locally in one or more registers of the processing-in-memory component 112, or combinations thereof.

The example techniques described herein are merely illustrative and many variations are possible based on this disclosure. Although features and elements are described above in particular combinations, each feature or element is usable alone without the other features and elements or in various combinations with or without other features and elements.

The various functional units illustrated in the figures and/or described herein (including, where appropriate, the host 102 having the core 108 and the memory module 104 having the memory 110 and the processing-in-memory component 112) are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system comprising:
a memory mounted on a circuit board, the memory including an in-memory processor configured to:
receive data evaluation logic comprising instructions executable by the in-memory processor;
evaluate a number of bits required to represent data stored in at least one memory location of the memory by executing the data evaluation logic and terminating executing the data evaluation logic responsive to identifying that a threshold number of memory locations use more than a threshold number of bits to store the data, wherein executing the data evaluation logic is performed independent of traffic on a connection between the memory and a source from which the data evaluation logic was received; and
output a result indicating the number of bits required to represent the data stored in the at least one memory location.

2. The system of claim 1, wherein the data stored in the at least one memory location is stored in a floating-point format and the in-memory processor is configured to execute the data evaluation logic by extracting floating point range bits from the at least one memory location.

3. The system of claim 1, wherein the data stored in the at least one memory location is stored in an integer format and the in-memory processor is configured to execute the data evaluation logic by extracting a subset of bits for the integer format from the at least one memory location, wherein the subset of bits is specified by the data evaluation logic.

4. The system of claim 1, wherein the result indicates a maximum number of bits required to represent the data stored in the at least one memory location.

5. The system of claim 1, wherein the in-memory processor is configured to receive the data evaluation logic as part of a command received from a host that includes a core, wherein the in-memory processor is configured to output the result to the host.

6. The system of claim 5, wherein the in-memory processor is one of a plurality of in-memory processors and wherein the memory is configured to load the data evaluation logic into each of the plurality of in-memory processors and cause each of the plurality of in-memory processors to execute the data evaluation logic.

7. The system of claim 1, wherein the in-memory processor is configured to execute the data evaluation logic responsive to detecting a memory operation at the at least one memory location.

8. The system of claim 1, wherein the data evaluation logic identifies the at least one memory location.

9. The system of claim 1, wherein the in-memory processor is configured to output the result by writing the result to a memory location that is communicatively coupled to a host that includes a core.

10. The system of claim 9, wherein the core is a central processing unit or a graphics processing unit.

11. The system of claim 1, wherein the in-memory processor is configured to output the result by storing the result in a register of the in-memory processor.

12. A device comprising:

a plurality of processors, at least one processor of the plurality of processors configured to:

load data evaluation logic into an in-memory processor; and cause the in-memory processor to:

evaluate, by executing the data evaluation logic, a number of bits required to represent data stored in at least one memory location of a memory, independent of traffic on a connection between the memory and the plurality of processors;

terminate execution of the data evaluation logic responsive to identifying that a threshold number of memory locations use more than a threshold number of bits to store the data; and output a result indicating the number of bits required to represent the data stored in the at least one memory location.

13. The device of claim 12, wherein the at least one processor is configured to load the data evaluation logic into the in-memory processor responsive to receiving a data evaluation command from a host that includes a core, wherein the in-memory processor is caused to output the result by communicating the result to the host.

14. The device of claim 13, wherein the at least one processor is further configured to load the data evaluation logic into a plurality of in-memory processors responsive to receiving the data evaluation command from the host and cause each of the plurality of in-memory processors to execute the data evaluation logic.

15. The device of claim 12, wherein the result indicates a maximum number of bits required to represent the data stored in the at least one memory location.

16. The device of claim 12, wherein the in-memory processor is caused to execute the data evaluation logic responsive to detecting a memory operation at the at least one memory location.

17. The device of claim 12, wherein the in-memory processor is caused to output the result by writing the result to a memory location that is communicatively coupled to a host that includes a core.

18. A method comprising:

monitoring, by an in-memory processor mounted on a circuit board, at least one memory location of a memory mounted on the circuit board;

executing, by the in-memory processor, instructions of stored data evaluation logic to evaluate a number of bits required to represent data stored in the at least one memory location in response to detecting a memory operation at the at least one memory location and terminating executing the stored data evaluation logic responsive to identifying that a threshold number of memory locations use more than a threshold number of bits to store the data, wherein executing the instructions of the stored data evaluation logic and terminating executing the stored data evaluation logic is performed independent of traffic on a connection between the memory and a processing device external to the memory; and outputting a result indicating the number of bits required to represent the data stored in the at least one memory location.

19. The method of claim 18, wherein the data stored in the at least one memory location is stored in:

a floating-point format and the in-memory processor is configured to execute the stored data evaluation logic by extracting floating point range bits from the at least one memory location; or an integer format and the in-memory processor is configured to execute the stored data evaluation logic by extracting a subset of bits for the integer format from the at least one memory location, wherein the subset of bits is specified by the stored data evaluation logic.

20. The method of claim 18, further comprising receiving the data evaluation logic as part of a command received from the processing device external to the memory, wherein the in-memory processor is configured to output the result to the processing device external to the memory.

* * * * *